(12) United States Patent
Matsumura et al.

(10) Patent No.: US 7,710,845 B2
(45) Date of Patent: May 4, 2010

(54) HOLOGRAPHIC MEMORY AND HOLOGRAPHIC RECORDING APPARATUS

(75) Inventors: Yoshiyuki Matsumura, Anpachi-Gun (JP); Ken Anderson, Boulder, CO (US); Kevin Curtis, Longmont, CO (US)

(73) Assignee: Sanyo Electric Co., Ltd., Osaka (JP)

( * ) Notice: Subject to any disclaimer, the term of this patent is extended or adjusted under 35 U.S.C. 154(b) by 597 days.

(21) Appl. No.: 11/673,314

(22) Filed: Feb. 9, 2007

(65) Prior Publication Data
US 2008/0192313 A1  Aug. 14, 2008

(51) Int. Cl.
*G11B 7/00* (2006.01)
(52) U.S. Cl. .................................... 369/103
(58) Field of Classification Search ............. 369/103, 369/116, 44.26, 47.5, 47.51, 47.52, 47.53, 369/47.27
See application file for complete search history.

(56) References Cited

U.S. PATENT DOCUMENTS

| | | | | |
|---|---|---|---|---|
| 7,130,092 B1 * | 10/2006 | Horimai | ...................... | 359/35 |
| 7,206,108 B2 * | 4/2007 | Tsukagoshi | .................. | 359/35 |
| 7,486,424 B2 * | 2/2009 | Kanaoka et al. | ............... | 359/22 |
| 7,492,691 B2 * | 2/2009 | Earhart | ........................ | 369/103 |
| 7,508,744 B2 * | 3/2009 | Yamakage et al. | .......... | 369/103 |
| 2006/0114792 A1 * | 6/2006 | Uno et al. | .................... | 369/103 |

FOREIGN PATENT DOCUMENTS

| JP | 63-108539 | * 5/1988 | ................ 369/53.1 |
|---|---|---|---|
| JP | 10-124872 | 5/1998 | |
| JP | 11-16374 | 1/1999 | |
| JP | 11-133843 | 5/1999 | |
| JP | 2000-338846 | 12/2000 | |
| JP | 2005-326710 | 11/2005 | |

* cited by examiner

*Primary Examiner*—Nabil Z Hindi
(74) *Attorney, Agent, or Firm*—Ditthavong, Mori & Steiner, P.C.

(57) ABSTRACT

The light energy necessary for the precure process is held by the RFID at the holographic memory. The controller acquires the light energy corresponding to the temperature of the recording position detected by the temperature sensor out of the precure information acquired by the RFID reader. The exposure time (light emitting time of LED) Te in the precure process is calculated based on the calculating equation Te (sec)=En (joule)/Pd (watt) from the energy En and the intensity Pd of light irradiated onto the recording position detected by the light detector.

10 Claims, 6 Drawing Sheets

| TEMPERATURE | LIGHT ENERGY | | |
|---|---|---|---|
| T1 | E1 | | |
| T2 | E2 | | |
| ... | ... | | |
| Tn | En | | |

HOLOGRAPHIC MEMORY AND HOLOGRAPHIC RECORDING APPARATUS

BACKGROUND OF THE INVENTION

1. Field of the Invention

The present invention relates to holographic memories where information is recorded by fixing the interference pattern of when the signal light and the reference light are internally interfered, and holographic recording apparatuses for recording information on the holographic memory, in particular, to the holographic recording apparatus suitably used in executing the precure process as the pre-process in recording.

2. Disclosure of Background Art

Generally, the holographic memory is recorded with information by fixing the interference pattern of when the signal light and the reference light are internally interfered to the holographic memory material layer. The signal light is spatially light modulated according to the recording information, and thus the interference pattern of light and dark corresponding to the recording information is produced at the holographic memory material layer when the signal light and the reference light are irradiated onto the holographic memory media. The refraction index distribution corresponding to the interference pattern is established in the holographic memory material layer when the monomer of high photo-polymerization in the holographic memory material layer is attracted and polymerized in the region of "light" of the relevant interference pattern. The recording of information on the holographic memory is thereby performed.

In the holographic memory, simultaneously recording a plurality of types of information on one recording location (recording block) by changing the incident angle of the reference light with respect to the holographic memory material layer (angle multiplexing) is known. That is, the interference pattern corresponding to the recording information can be fixed at the same recording location individually for every angle by spatially light modulating the signal light with different information for each incident angle of the reference light.

In recording of information, the precure process for activating the holographic memory material layer is performed as the pre-process. In the precure process, the light of waveband defined in advance is irradiated onto the recording position for a constant time. The energy of the light necessary for the precure process differs for each media. If the light is irradiated for longer than necessary in the precure process, the monomer in the holographic memory material layer is consumed, and the number of holograms that can be multiplexed on the recording layer reduces.

SUMMARY OF THE INVENTION

The present invention aims to, in view of solving the above problem, appropriately perform the precure process on different media.

The first aspect of the present invention relates to a holographic memory. The holographic memory according to this aspect includes information (precure related information) related to the light energy necessary for the precure process. The information is recorded in the holographic memory material layer in the form of hologram. Alternatively, the information is recorded on the casing such as cartridge for holding the holographic memory media in a form readable by a holographic recording apparatus. When recorded on the casing, the precure related information is recorded using RFID (Radio Frequency Identification), barcode etc. Since the energy necessary for the precure process changes depending on the temperature of the media, several kinds of precure related information are preferably recorded on the holographic memory in correspondence to temperature. For example, the precure related information is recorded in the holographic memory for every one degree.

A second aspect of the present invention relates to a holographic recording apparatus. The holographic recording apparatus according to this aspect has a configuration of reading the precure related information from the holographic memory of the first aspect. For example, if the precure related information is recorded with the RFID, the holographic recording apparatus includes an RFID reader. The holographic recording apparatus calculates the irradiating time of the light in the precure process from the read precure related information. Specifically, the holographic recording apparatus acquires the light energy necessary for the precure process from the precure related information, and at the same time, detects the intensity of the light irradiated in the precure process, and calculates the irradiating time of the light in the precure process from the acquired light energy and the intensity of the detected light. The holographic recording apparatus then irradiates the light onto the holographic memory for the calculated irradiating time. If a plurality of precure related information is prepared in correspondence to the temperature, the holographic recording apparatus includes a temperature sensor for detecting the temperature of the recording position. In this case, the holographic recording apparatus selects the precure related information corresponding to the temperature of the recording position out of the precure related information acquired from the holographic memory, and calculates the irradiating time of the light in the precure process based on the selected precure related information.

According to the first and second aspects, the light is not irradiated for longer than necessary in the precure process since the irradiating time of the light in the precure process is calculated based on the precure related information recorded on the holographic memory, and thus the monomers in the recording layer are not unnecessarily consumed. Furthermore, the appropriateness of the irradiating time of the light is further enhanced if the irradiating time of the light in the precure process is calculated taking the temperature of the recording position into consideration.

BRIEF DESCRIPTION OF THE DRAWINGS

The invention, together with objects and advantages thereof, may best be understood by reference to the following description of the presently preferred embodiments together with the accompanying drawings in which:

FIG. 2 is a view showing a configuration of an optical head of the holographic memory device according to the embodiment;

It should be noted that the drawings are merely illustrative and are not intended to limit the scope of the present invention.

DETAILED DESCRIPTION OF THE PREFERRED EMBODIMENT

The embodiment of the present invention will now be described with reference to the drawings.

Figure 1:
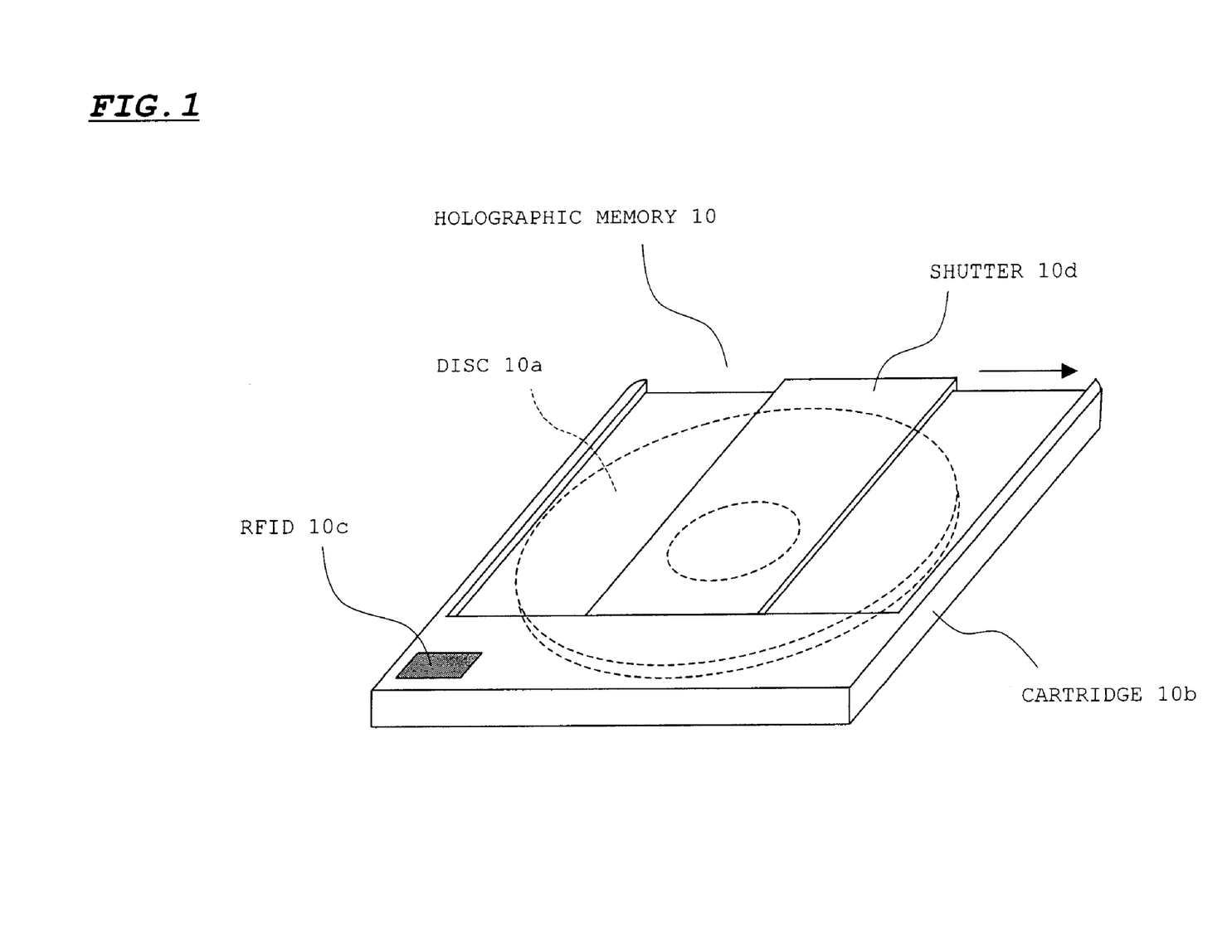
FIG. 1 is a view showing a configuration of a holographic memory according to the embodiment.

FIG. 1 shows the configuration of the holographic memory 10. The holographic memory 10 is configured by accommodating the disc 10a (holographic memory media) in the cartridge 10b. A shutter 10d is slidably arranged on the cartridge 10b. The disc 10a is exposed to the outside by sliding the shutter 10d in the direction of the arrow of FIG. 1. Recording on the disc 10a thereby becomes possible.

RFID 10c is attached to the upper surface of the cartridge 10b. The light energy (precure information) necessary for the precure process on the disc 10a is recorded on the RFID 10c. The light energy is verified in advance on the manufacturing corporation side of the holographic memory 10. That is, the suitable light energy for the precure process on the disc 10a is recorded on the RFID 10c.

Figure 2:
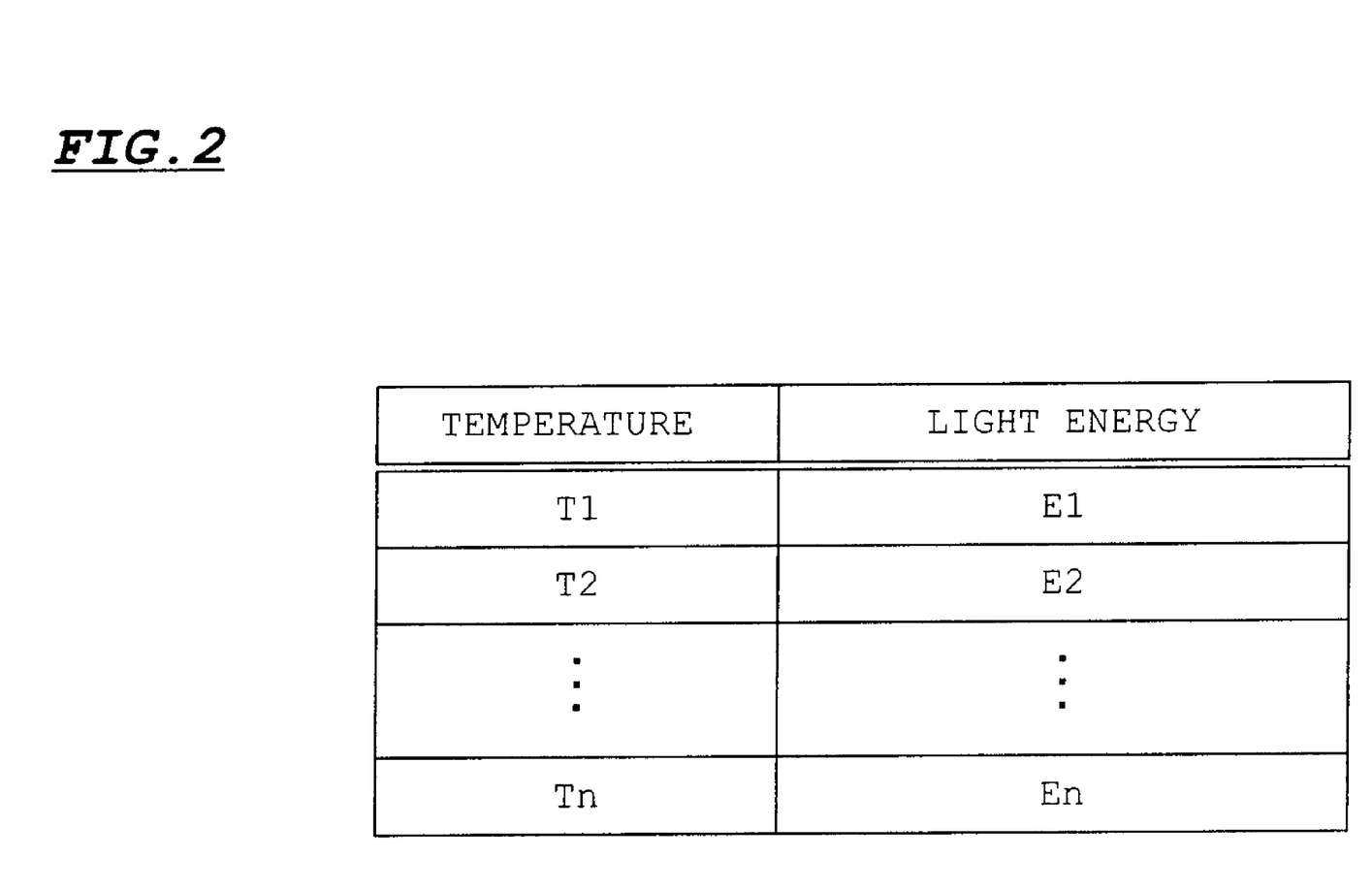
FIG. 2 is a view showing a configuration of precure information according to the embodiment.

FIG. 2 shows the configuration of the precure information recorded on the RFID 10c. As shown in the figure, the light energy necessary for the precure process is recorded on the RFID 10c in correspondence to the temperature. The temperature is set for every constant temperature (e.g., each ° C.) within the range of maximum temperature and minimum temperature assumed for the precure process.

Figure 3:
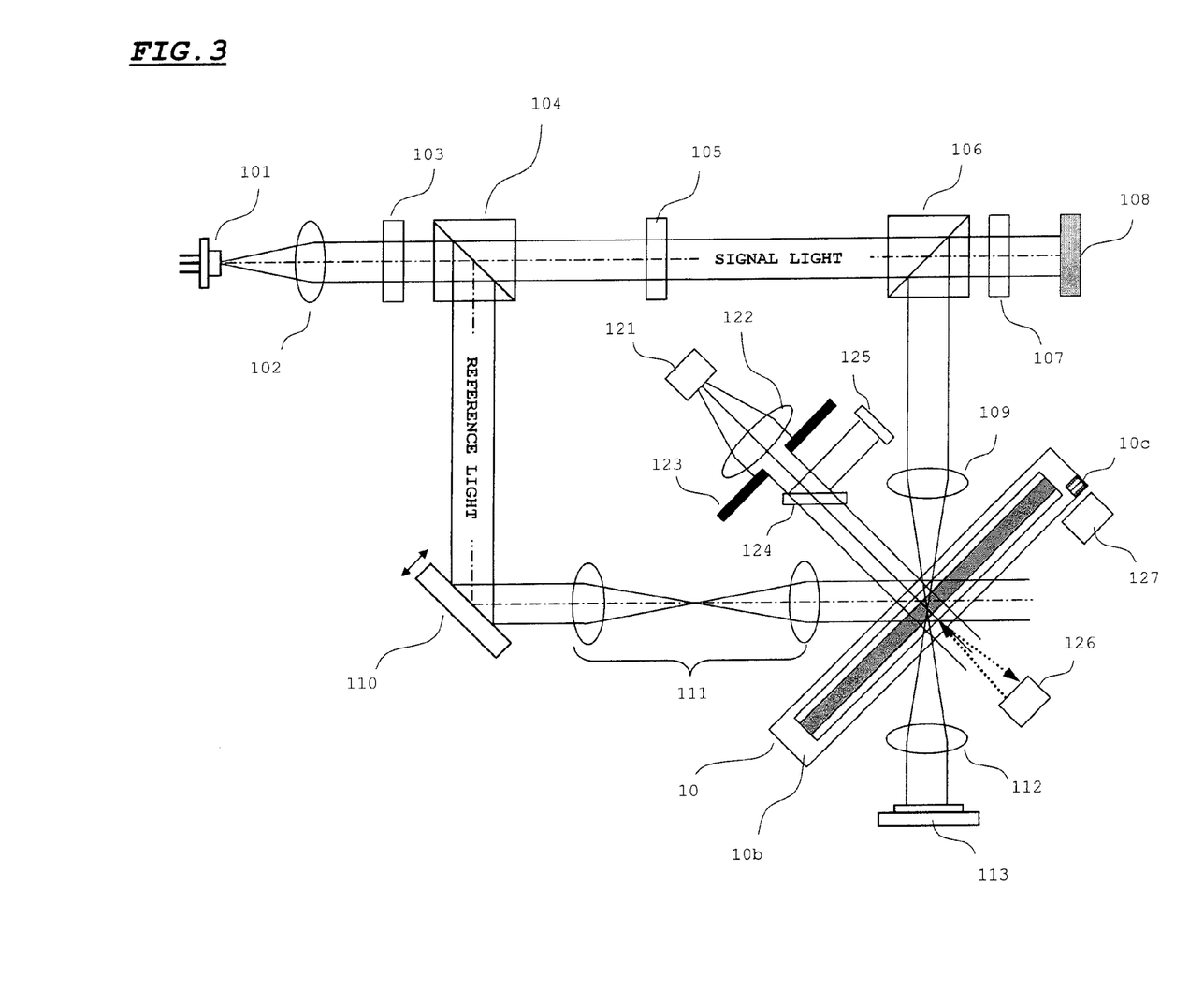

FIG. 3 shows the configuration of the optical head of the holographic memory device. The optical head is used in performing recordation/reproduction of the information with respect to the transmissive holographic memory 10.

As shown in the figure, the optical head includes a semiconductor laser 101, a collimator lens 102, a shutter 103, a polarizing beam splitter 104, a shutter 105, a polarizing beam splitter 106, a λ/4 plate 107, a spatial light modulator 108, a Fourier transform lens 109, a galvanometer mirror 110, a relay lens 111, a Fourier transform lens 112, and a CMOS (Complementary MOS) image sensor 113.

Furthermore, the optical head includes an LED 121, a collimator lens 122, an aperture 123, a half mirror 124, and a light detector 125, a temperature sensor 126, and an RFID reader 127 for the precure process.

The semiconductor laser 101 emits the laser light of the wavelength suited to the holographic memory 10. The collimator lens 102 converts the laser light input from the semiconductor laser 101 to a parallel light. The shutter 103 is configured by a mechanical shutter and the like, and performs transmission/shielding of the laser light according to the control signal. Specifically, the shutter 103 is turned OFF (transmit) only in time of exposure in the recording/reproducing operation. The exposure time on the holographic memory 10 is controlled by the time period the shutter is turned OFF. The polarizing beam splitter 104 divides the laser light from the collimator lens 102 to the signal light and the reference light.

The shutter 105 is configured by a mechanical shutter and the like, and performs transmission/shielding of the signal light according to the control signal. Specifically, the shutter 105 is turned OFF (transmit) in time of recordation and turned ON (shield) in time of reproduction.

The polarizing beam splitter 106 transmits substantially the entire signal light entering from the shutter 105, and reflects or transmits the signal light input from the λ/4 plate 107. The λ/4 plate 107 converts the signal light entering from the polarizing beam splitter 106 from linear polarization to circular polarization, and converts the signal light of circular polarization entering from the spatial light modulator 108 to linear polarization.

The spatial light modulator 108 is configured by a combination of liquid crystal panel and reflective mirror etc., and controls the polarization state of the signal light for each pixel according to the recording signals (binary data of 1, 0), thereby applying spatial light modulation corresponding to the recording signal to the signal light.

The signal light of P polarization that has transmitted the polarizing beam splitter 106 is converted to the circular polarization of right turn or left turn by the λ/4 plate 107. The turning direction of the signal light is determined by the direction of the crystal axis of the λ/4 plate 107. For example, if the turning direction of the signal light is a right turn, the signal light remains in the right turn at the pixel position of digital data "1" and changes to the left turn at the pixel position of digital data "0", for example, as the signal light reciprocates the liquid crystal panel of the spatial light modulator 108. Therefore, the signal light becomes S polarization at the pixel position of digital data "1" and becomes P polarization at the pixel position of digital data "0" by again passing through the λ/4 plate 107. Only the light of S polarization for the digital data "1" is reflected by the polarizing beam splitter 106, and the light of P polarization for the digital data "0" is transmitted through the polarizing beam splitter 106.

The Fourier transform lens 109 converges the signal light entering from the polarizing beam splitter 106 onto the holographic memory material layer in the holographic memory 10.

The galvanometer mirror 110 reflects the reference light and is rotated in the in-plane direction of the plane including the optical axes of the signal light and the reference light according to the control signal. The incident angle of the reference light with respect to the recording block is adjusted by turning the galvanometer mirror 110. The relay lens 111 leads the reference light reflected by the galvanometer mirror 110 towards the recording block of the holographic memory 10.

The Fourier transform lens 112 converts the reference light that has been diffracted by the holographic memory material layer and transmitted through the holographic memory 10 (hereinafter referring the reference light after transmitting through the holographic memory 10 as particularly "reproduction light") to a parallel light, and leads the parallel light to the CMOS image sensor 113. The CMOS image sensor 113 outputs the electric signal corresponding to the intensity distribution of the reproduction light received via the Fourier transform lens 112 to a signal amplifying circuit (to be hereinafter described).

The LED 121 outputs a light of defined waveband. The light is converted to a parallel light by the collimator lens 122, and then shaped to a predetermined shape by the aperture 123. The shape of the aperture 123 is the shape of the recording block set in the holographic memory material layer. When the shape of the recording block seen from the upper surface side of the holographic memory material layer is set to a square, the shape of the aperture 123 is a square. In this case, the light from the LED 121 is irradiated onto the holographic memory 10 with the cross section same as the shape of the recording block or as a slightly larger square.

The light that has passed the aperture 123 has a half of the same transmitted through the half mirror 124, and the remaining half reflected by the half mirror 124. The light reflected by the half mirror 124 is received by the light detector 125. The light detector 125 outputs the electric signal corresponding to the intensity of the received light.

The light that has transmitted through the half mirror 124 is irradiated onto the holographic memory material layer of the holographic memory 10. This light enters the holographic memory material layer so that the optical axis becomes perpendicular to the surface of the holographic memory material layer. That is, the optical system from the LED 121 to the light detector 125 is arranged so that the light from the LED 121 perpendicularly enters the surface of the holographic memory material layer.

The temperature sensor 126 detects the temperature of the holographic memory material layer. The detecting position of temperature is set to the incident position of the light from the LED 121. The RFID reader 127 reads the information (precure information) of the RFID 10c attached to the cartridge 10b of the holographic memory 10, which RFID reader 127 is arranged at a position facing the RFID 10c.

The light intensity detected by the light detector 125, the temperature detected by the temperature sensor 126, and the precure information acquired by the RFID reader 127 are used to calculate the light emitting time of the LED 121 in the precure process. The calculation process will be hereinafter described in detail.

In recording, the laser light exited from the semiconductor laser 101 is converted to the parallel light by the collimator lens 102, and then passed through the shutter 103, and divided to the signal light and the reference light by the polarizing beam splitter 104. The signal light is passed through the shutter 105, and then transmitted through the polarizing beam splitter 106 and modulated by the spatial light modulator 108. The signal light modulated by the spatial light modulator 108 is reflected at the polarizing beam splitter 106, and then converged and irradiated onto the holographic memory 10 by the Fourier transform lens 109. The reference light is reflected by the galvanometer mirror 110, and then entered to the signal light irradiating position of the holographic memory 10 via the relay lens 111.

The signal light and the reference light are thereby irradiated onto the holographic memory material layer of the holographic memory 10. The interference pattern thereby produces at the laser light irradiating location of the holographic memory material layer, and the monomer polymerizes according to the interference pattern. The refraction index distribution corresponding to the interference pattern is thus fixed to the hologram material layer, and recordation on the holographic memory is performed.

In recording by angle multiplexing, the galvanometer mirror 110 is rotated by a predetermined angle (by amount of page forwarding), and the incident angle of the reference light with respect to the holographic memory 10 is changed. The reference light reflected by the galvanometer mirror 110 is irradiated onto the irradiating position of the signal light by changing only the angle with respect to the holographic memory 10 without changing the incident position on the holographic memory 10 through the relay lens 111. The recording signal for the next page is provided to the spatial light modulator 108 according to the change in angle of the reference light. The change in angle of the relevant reference light and the change in recording signal for the spatial light modulator 108 are repeated until multiplex recording on the relevant recording block is completed. The interference pattern that differs for every incident angle of the reference light produces at the relevant block, and consequently, the refraction index distribution corresponding to the different interference pattern fixes to the relevant recording block. Therefore, the different recording signals are recorded on the relevant recording block through angle multiplexing.

In reproducing, the laser light exited from the semiconductor laser 101 is converted to the parallel light by the collimator lens 102, and then passed through the shutter 103 and divided into the signal light and the reference light by the polarizing beam splitter 104. The signal light is shielded by the shutter 105. The reference light is irradiated onto the holographic memory material layer of the holographic memory 10 via the galvanometer mirror 110 and the relay lens 111.

Thereafter, the reference light is diffracted by the interference pattern fixed at the holographic memory material layer, and passed through the holographic memory 10. Subsequently, the reference light (reproduction light) is converted to the parallel light by the Fourier transform lens 112 and entered to the CMOS image sensor 113.

The CMOS image sensor 113 outputs the electric signal corresponding to the intensity distribution of the received reproduction light to the signal amplifier circuit (hereinafter described). The intensity distribution of the reproduction light received by the CMOS image sensor 113 corresponds to the spatial light modulation applied to the signal light by the spatial light modulator 108 in recording. The CMOS image sensor 113 has the position and the angle in the direction parallel to the light receiving surface adjusted by an adjusting mechanism (not shown). The electric signal output from the CMOS image sensor 113 is amplified by the signal amplifying circuit and then demodulated by a decoder.

The precure process on the recording block is performed prior to the recording. That is, the LED 121 is driven by a predetermined time, and the light of defined waveband is irradiated onto the recording block.

Figure 4:
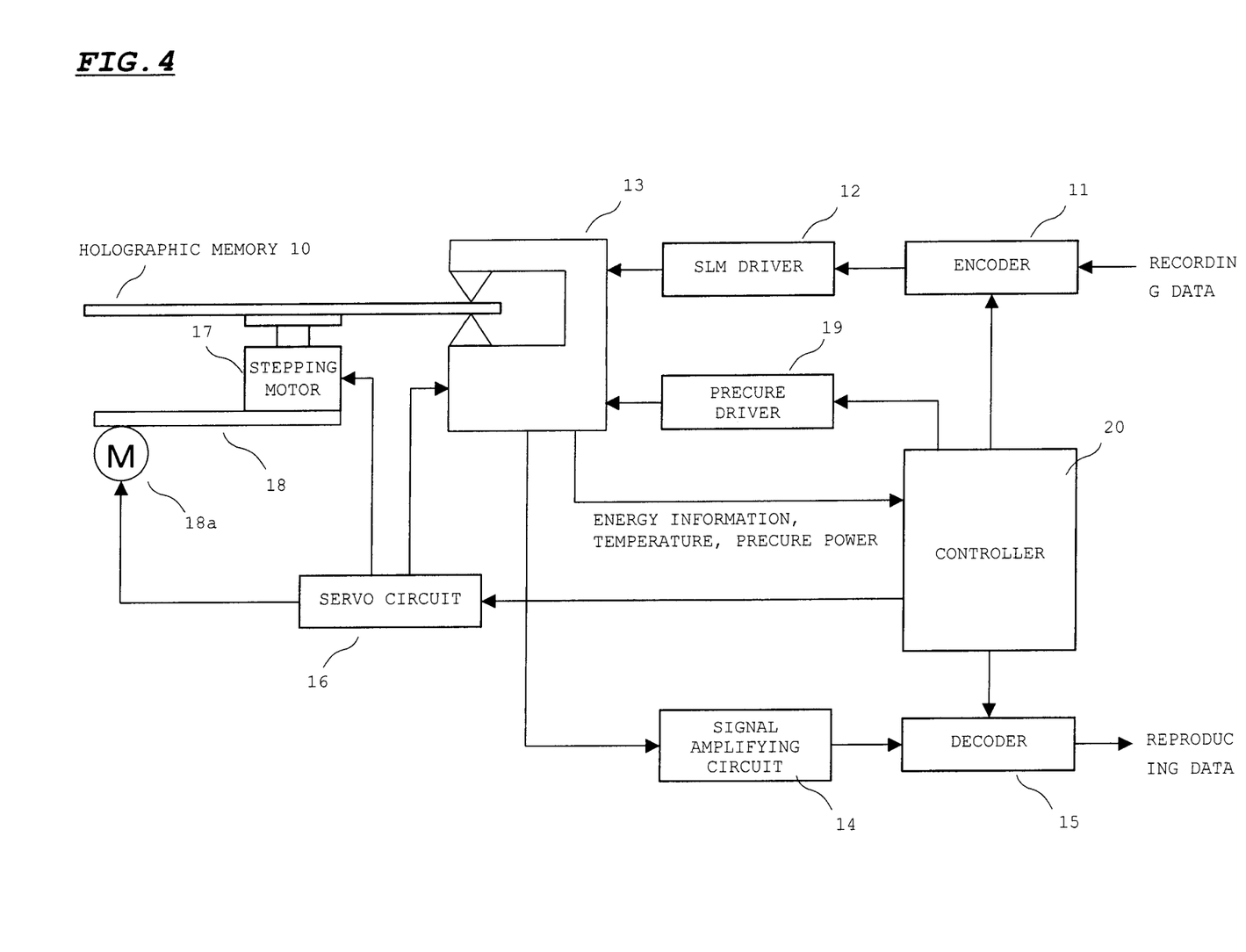
FIG. 4 is a view showing the holographic memory device according to the embodiment.

FIG. 4 is a view showing the configuration of the holographic memory device. As shown in the figure, the holographic memory device includes an encoder 11, an SLM driver 12, an optical head 13, a signal amplifying circuit 14, a decoder 15, a servo circuit 16, a stepping motor 17, a feeding mechanism 18, a precure driver 19, and a controller 20.

The encoder 11 performs the encoding process on the recording data and outputs the result to the SLM driver 12. The SLM driver 12 generates a recording signal for driving the spatial light modulator 108 from the encoding processed recording data, and drives the spatial light modulator 108 in the optical head 13 according to the generated recording signal.

The optical head 13 has the configuration of FIG. 3, where the signal light and the reference light for recordation and reproduction are irradiated onto the holographic memory 10. The light for the precure process is irradiated onto the recording block for a predetermined time prior to the recording. The optical head 13 further outputs the signal from the CMOS image sensor 113 to the signal amplifying circuit 14, and also outputs the signals from the light detector 125, the temperature sensor 126, and the RFID 10c to the controller 20.

The signal amplifying circuit 14 amplifies the electric signal output from the CMOS image sensor 113 in the optical head 13, and outputs the result to the decoder 15. The decoder 15 decodes the reproducing signal input from the signal amplifying circuit 14, generates the reproducing data, and outputs the reproducing data to the post-stage circuit.

The servo circuit 16 generates the servo signal for step feeding the holographic memory 10 in the circumferential direction of the disc according to the control command from the controller 20, and outputs the servo signal to the stepping motor 17. Furthermore, the servo circuit 16 generates the servo signal for step feeding the holographic memory 10 in the radial direction of the disc according to the control command from the controller 20, and outputs the servo signal to the drive motor 18a of the feeding mechanism 18. Moreover, the servo circuit 16 performs drive control of the semiconductor laser 101 arranged in the optical head 13, ON/OFF control of the shutters 103, 105, and the drive control of the galvanometer mirror 110 according to the control command from the controller 20.

The stepping motor 17 step feeds the holographic memory 10 in the circumferential direction of the disc according to the servo signal from the servo circuit 16. The feeding drive mechanism 18 slidably supports the stepping motor 17 so that the optical head 13 and the holographic memory 10 relatively move in the radial direction of the disc. The motor (stepping motor) 18a provides the driving force for step feeding the stepping motor 17 in the radial direction.

The precure driver 19 drives the LED 121 in the optical head 13 according to the control command from the controller 20.

The controller 20 controls each part according to predetermined controlling procedures. The controller 20 calculates the light emitting time of the LED 121 for the precure process based on the light intensity detected by the light detector 125, the temperature detected by the temperature sensor 126, and the precure information acquired by the RFID reader 127. That is, the controller 20 acquires the light energy (energy necessary for precure process) corresponding to the temperature closest to the temperature detected by the temperature sensor 126 out of the precure information (FIG. 2) acquired by the RFID reader 127. The exposure time (light emitting time of LED 121) Te for the precure process is calculated based on the following equation from the energy En, and the light intensity Pd detected by the light detector 125.

$$Te\ (\text{sec}) = En\ (\text{joule})/Pd\ (\text{watt}) \quad (1)$$

The operation in recording will now be described with reference to FIG. 5.

When the holographic memory 10 is loaded to the holographic memory device (S101), the RFID 10c attached to the cartridge 10b of the holographic memory 10 is read by the RFID reader 127 of the optical head 13, and the read information (precure information) is stored in the memory in the controller 20 (S102). Thereafter, when the recording command is input from the user (S103: YES), the stepping motor 17 and the motor 18a are driven, and the optical head 13 is accessed to the recording position (S104). The temperature of the holographic memory material layer at the relevant position is detected by the temperature sensor 126 in the optical head 13, and the detected temperature is output to the controller 20 (S105).

When detection of the temperature is finished, the LED 121 in the optical head 13 is lighted for a constant time (S106), and the intensity of the light irradiated from the LED 121 to the holographic memory material layer is detected by the light detector 125 in the optical head (S107). The lighting time of the LED 121 is the minimum time necessary for the detection of the light intensity Pd to suppress consumption of the monomer of the holographic memory material layer. To ensure the suppression of the unnecessary monomer consumption, the shutter 10d shown in FIG. 1 may be closed during the lighting of the LED 121 in S107.

After the light intensity Pd is detected in such manner, the controller 20 acquires the light energy (energy necessary for precure process) corresponding to the temperature detected by the temperature sensor 106 out of the precure information (FIG. 2) acquired by the RFID reader 127, and calculates the exposure time Te for the precure process based on equation (1) from the energy En and the light intensity Pd detected by the light detector 125 (S108). The LED 121 is then lighted for the calculated exposure time Te (S109), and the precure process on the recording position is performed.

After the precure process is finished, the recording process on the relevant recording block is performed (S110). When the recording process on the recording block is completed, determination is made on whether or not recording on other recording blocks is continuously necessary (S111), and if not necessary (S111: YES), the recording operation is completed. If the recording on the other recording blocks is necessary, the process returns to S104, and the processes on the other recording blocks are performed, similar to the above.

Since the exposure time Te for the precure process is calculated based on the precure information recorded on the holographic memory 10 according to the present embodiment, the exposure is not performed longer than necessary in the precure process, and thus the monomer in the holographic memory material layer is not unnecessarily consumed. Furthermore, since the exposure time for the precure process is calculated taking the temperature of the recording position into consideration according to the present embodiment, the appropriateness of the exposure time is further enhanced, and the unnecessary monomer consumption is effectively suppressed.

According to the present embodiment, the light intensity per unit area on the holographic memory material layer does not change even if the distance between the holographic memory material layer in the holographic memory 10 and the LED 121 is changed since the precure light is made to a parallel light by the collimator lens 122. Thus, the light intensity per unit area irradiated onto the holographic memory material layer is accurately obtained from the light intensity detected by the light detector 125, and the appropriateness of the exposure time Te is achieved.

According to the present embodiment, since the irradiating region of the light is limited by the aperture 123, the irradiating region of the light is limited to the range (range of recording block) necessary for precure, and the unnecessary exposure is suppressed.

Figure 5:
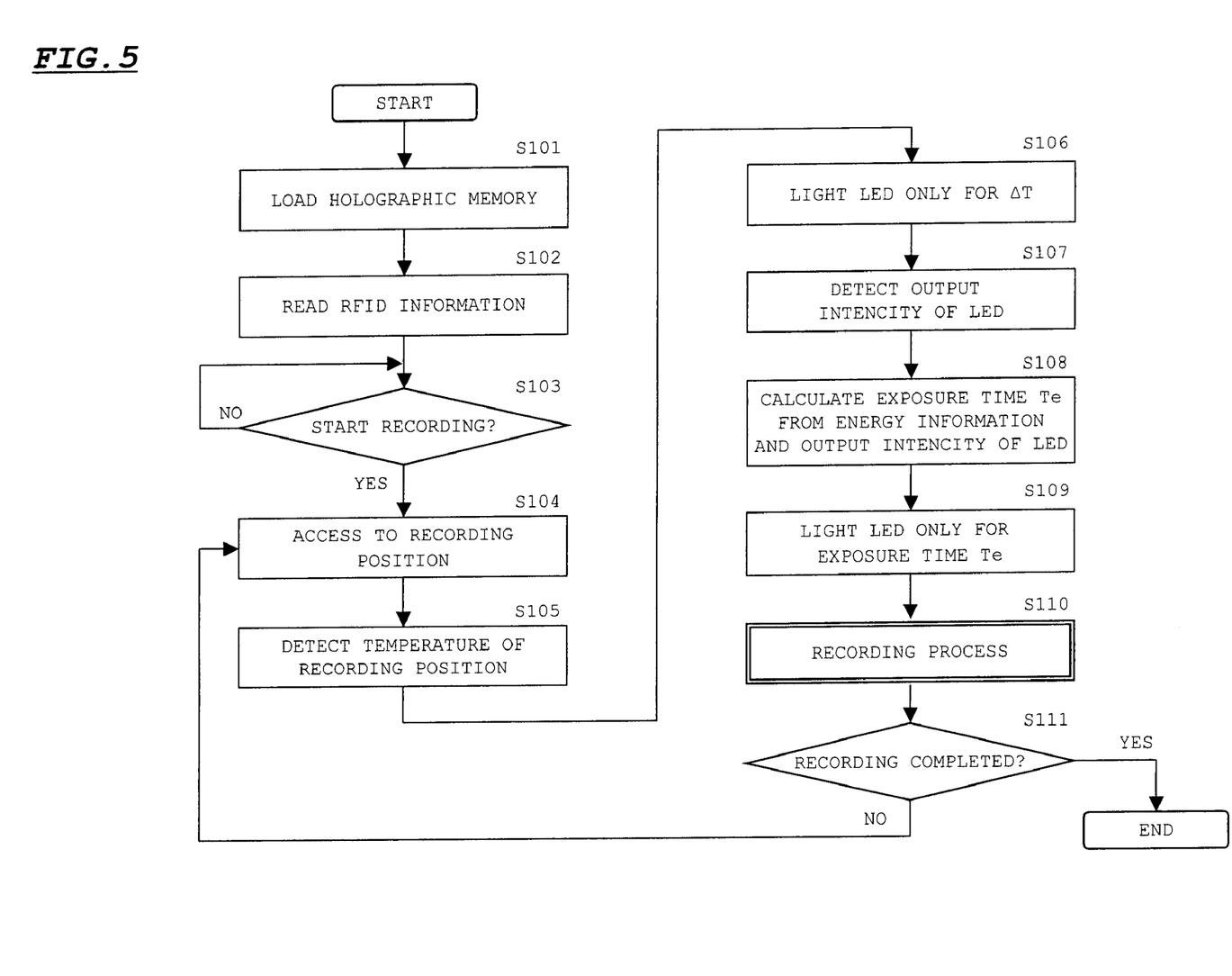
FIG. 5 is a flow chart in time of recording process according to the embodiment.

In the process flow chart shown in FIG. 5, the exposure time Te is calculated each time access is made to the recording position, but the exposure time Te set for the first recording position may be used as the exposure time for the other recording positions until one recording operation is completed. The precure process is thereby simplified. However, in this case, if a temperature difference exists between the first recording position and the other recording positions, the exposure on the other recording positions becomes longer or shorter than the appropriate time.

Furthermore, in the process flow chart shown in FIG. 5, the light intensity Pd is detected each time the recording position is accessed, but the light intensity Pd may be detected only when access is made to the first recording position, and the light intensity Pd of the first recording position is accessed may be used when calculating the exposure time for the other recording positions. Therefore, the unnecessary consumption of the monomer when the light from the LED 121 is irradiated onto the holographic memory material layer in detecting the light intensity Pd is avoided. However, in this case, the exposure on the other recording positions becomes longer or shorter than the appropriate time if the output of the LED 121 changes due to change in device environment and the like.

In the above embodiment, the exposure time Te (light emitting time of LED 121) for the precure process is calculated based on equation (1), but the exposure time Te may also be obtained from the following equation.

$$Te = \alpha \times En/(Pd+\beta) \quad (2)$$

α and β are correction constants of when obtaining the exposure time Te from the energy En necessary for the precure process and the light intensity Pd detected by the light detector 125.

The embodiment of the present invention has been explained, but the present invention is not limited to such embodiment, and various other changes may be made on the embodiment of the present invention.

For example, the light source for emitting the signal light and the reference light is not limited to the semiconductor laser 101, and may be an SHG laser.

The shutters 103, 105 are not limited to a mechanical shutter, and may be a liquid crystal shutter.

The spatial light modulator 108 is not limited to a combination of a liquid crystal and a mirror, and may be a DMD (Digital Micro-mirror Device). The spatial light modulator 108 may also be a light transmissive spatial light modulator configured only from the liquid crystal. In this case, the spatial light modulator is arranged at the post-stage of the shutter 105 in the optical system of FIG. 1.

Two or more mirrors may be combined in place of the relay lens 111 to adjust the incident position of the reference light.

The light detector for receiving the interference light is not limited to the CMOS image sensor 113, and may be a CCD image sensor and the like.

The multiplexing method is not limited to angle multiplexing, and may be other multiplexing methods or a combination of various multiplexing methods.

The step feeding in the radial direction of the holographic memory 10 is not limited to the configuration of step feeding the stepping motor 17, and the configuration of feeding the optical head 13 in the radial direction of the holographic memory 10 may be used.

Figure 6A:
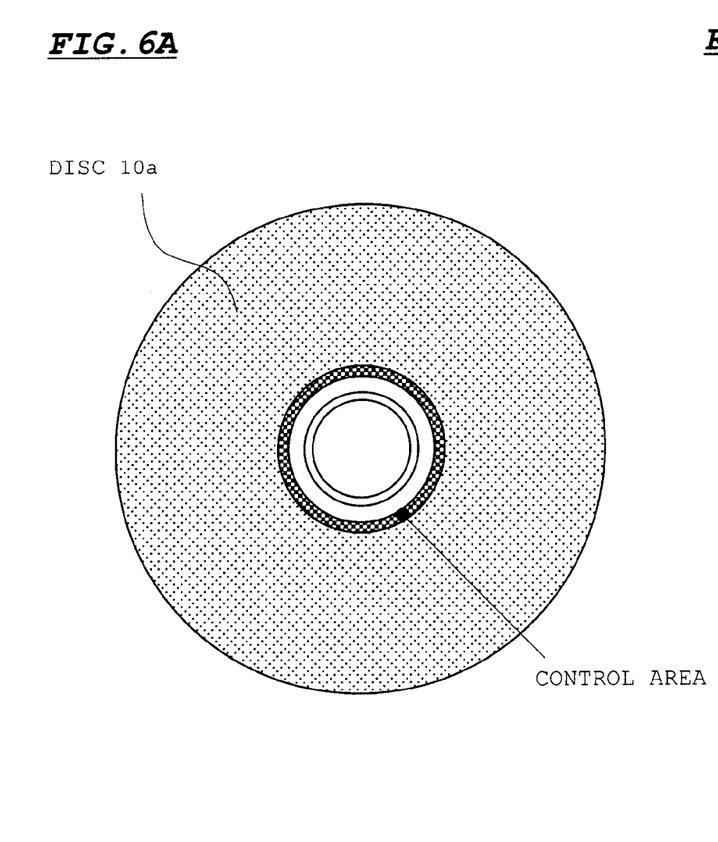
FIGS. 6A and 6B are variants of the holographic memory according to the embodiment.
Figure 6B:
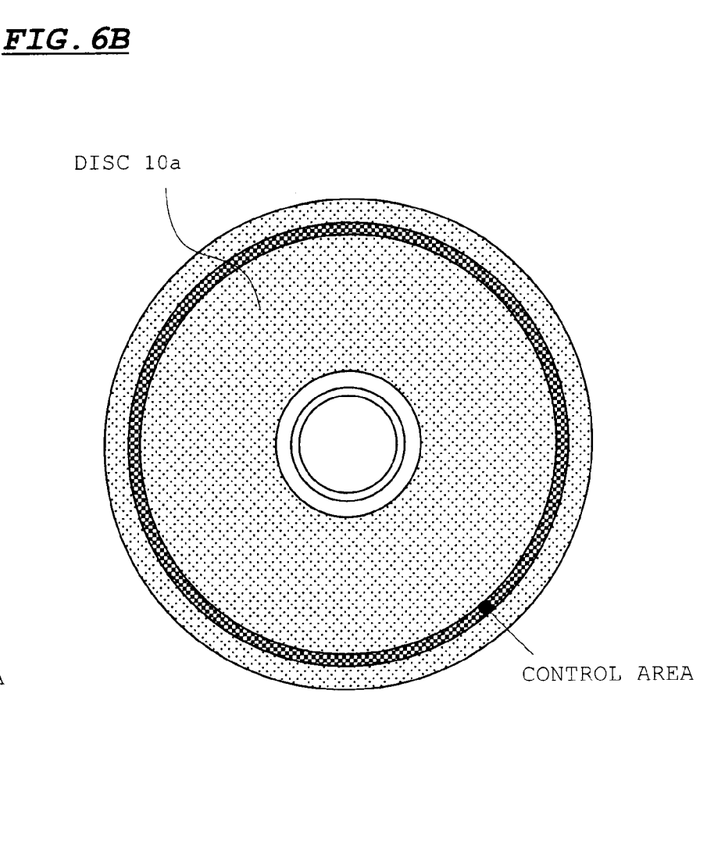

In the above embodiment, the precure information is recorded on the holographic memory 10 by attaching the RFID 10c to the cartridge 10b, but the precure information may, for example, be recorded as the hologram on a predetermined region (control area) of the disc 10a, as shown in FIGS. 6A and 6B. In this case, the precure information is acquired by irradiating the reference light to the control area, and receiving the reproducing light at the CMOS image sensor 113.

In the embodiment, the light energy necessary for the precure process itself is recorded on the holographic memory 10 in correspondence to the temperature, but the information for obtaining the light energy necessary for the precure process may be recorded in correspondence to the temperature.

A number of temperatures and light energies corresponding thereto are prepared in the above embodiment, but only one light energy corresponding to the reference temperature may be recorded on the holographic memory, in which case, the relationship between the reference temperature and the temperature of the recording block in recording and the light energy recorded on the holographic memory are applied to the property equation of the temperature versus light energy to calculate the light energy on the relevant recording block.

Alternatively, only one light energy corresponding to a standard temperature may be recorded on the holographic memory, and the exposure time in time of the precure process may be calculated using such light energy regardless of the temperature of the holographic memory material layer. However, in this case, the exposure time becomes longer or shorter than the appropriate time if the temperature of the recording position deviates from the standard temperature.

In the above embodiment, light is divided using the half mirror 124, but other light dividing elements may be used, and the ratio of light division does not need to be transmission: reflection of 1:1. However, if the ratio of transmission and reflection is not equal, the light intensity detected by the light detector 125 and the light intensity irradiated onto the holographic memory 10 do not match, and thus the ratio of the transmission and the reflection must be multiplied to the light intensity detected by the light detector 125 to obtain the light intensity Pd irradiated onto the holographic memory 10, and the light intensity Pd must be applied to equation (1) to obtain the exposure time Te.

The holographic memory device using the transmissive holographic memory is illustrated in the above embodiment, but the present invention is also applicable to the reflective holographic memory device.

In addition, the fixing process is appropriately performed following the recording operation when the process for fixing the interference pattern is necessary. The fixing process includes various methods such as a method of separately arranging a dedicated laser light other than a method of using the reference light as the fixation light.

Various modifications may be appropriately made on the embodiment of the present invention within the scope of the technical concept described in the claims.

What is claimed is:

1. A holographic memory comprising:
   a holographic memory media including a holographic material layer recordable with information by internally interfering a signal light and a reference light; and
   a casing for accommodating the holographic memory media; wherein
   information related to light energy necessary for a precure process is held at the casing in a device readable form.

2. The holographic memory according to claim 1, wherein the information related to the light energy is held in correspondence to several kinds of temperature.

3. A holographic memory comprising:
   a holographic memory media including a holographic material layer recordable with information by internally interfering a signal light and a reference light; wherein
   information related to light energy necessary for a precure process is held in the holographic material layer in a form of hologram.

4. The holographic memory according to claim 3, wherein the information related to the light energy is held in correspondence to several kinds of temperature.

5. A holographic recording apparatus for recording information on a holographic memory, the holographic memory including a holographic memory media with a holographic material layer recordable with information by internally interfering a signal light and a reference light and a casing for accommodating the holographic memory media, and information related to light energy necessary for a precure process being held at the casing in a device readable form; the holographic recording apparatus comprising:
   a precure optical system for irradiating a precure light on a recording position of the holographic memory;
   a detection optical system for detecting the intensity of the precure light irradiated on the recording position;
   a reading device for reading the information related to the light energy from the holographic memory;
   a light energy acquiring circuit for acquiring the light energy from the information read by the reading device; and
   a calculation circuit for calculating an irradiating time of the precure light on the recording position from the intensity of the light detected by the detection optical system and the light energy acquired by the light energy acquiring circuit.

6. The holographic recording apparatus according to claim 5, wherein the information related to the light energy is held in the holographic memory in correspondence to several kinds of temperature;

a temperature sensor for detecting the temperature of the recording position of the holographic memory is further arranged; and the energy acquiring circuit acquires the light energy from the information corresponding to the temperature detected by the temperature sensor out of the information read by the reading device.

7. The holographic recording apparatus according to claim 5, wherein the precure optical system includes a light source for outputting a light of a predetermined wave band, a collimator lens for converting the light from the light source to a parallel light, and an aperture for shaping the cross sectional shape of the light converted to the parallel light by the collimator lens to a predetermined shape.

8. A holographic recording apparatus for recording information on a holographic memory, the holographic memory including a holographic memory media with a holographic material layer recordable with information by internally interfering a signal light and a reference light, and information related to light energy necessary for a precure process being held in the holographic material layer in a form of hologram; the holographic recording apparatus comprising:

a reproduction optical system for reproducing the information from the holographic material layer;

a precure optical system for irradiating a precure light on a recording position of the holographic memory;

a detection optical system for detecting the intensity of the precure light irradiated on the recording position;

a light energy acquiring circuit for reading the information related to the light energy from the holographic memory via the reproduction optical system and acquiring the light energy from the read information; and a calculation circuit for calculating an irradiating time of the precure light on the recording position from the intensity of the light detected by the detection optical system and the light energy acquired by the light energy acquiring circuit.

9. The holographic recording apparatus according to claim 8, wherein the information related to the light energy is held in the holographic memory in correspondence to several kinds of temperature, a temperature sensor for detecting the temperature of the recording position of the holographic memory is further arranged; and the light energy acquiring circuit acquires the light energy from the information corresponding to the temperature detected by the temperature sensor out of the information read via the reproduction optical system.

10. The holographic recording apparatus according to claim 8, wherein the precure optical system includes a light source for outputting a light of a predetermined wave band, a collimator lens for converting the light from the light source to a parallel light, and an aperture for shaping the cross sectional shape of the light converted to the parallel light by the collimator lens to a predetermined shape.

* * * * *